Patented Oct. 16, 1923.

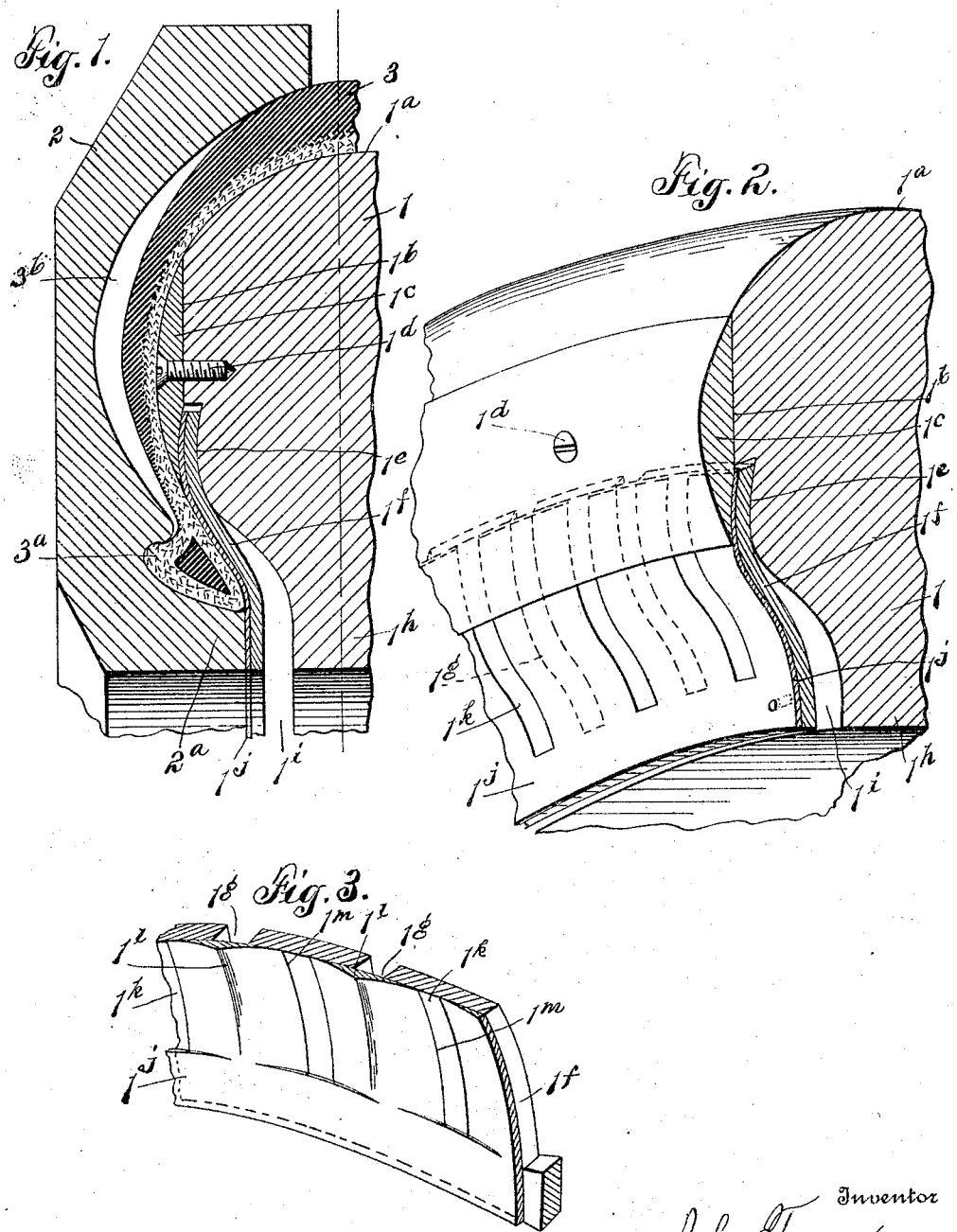

1,470,657

UNITED STATES PATENT OFFICE.

JOHN TRAUM, OF COSHOCTON, OHIO.

APPARATUS FOR VULCANIZING TIRE CASINGS.

Application filed July 13, 1922. Serial No. 574,599.

*To all whom it may concern:*

Be it known that I, JOHN TRAUM, a citizen of the United States, residing at Coshocton, in the county of Coshocton and State of Ohio, have invented certain new and useful Improvements in Apparatus for Vulcanizing Tire Casings, of which the following is a specification.

My invention relates to improvements in apparatus for vulcanizing tire casings, embodying improved casing conforming mold and core parts, the improved core embodying laterally expansible and contractible tire heel engaging parts adapted to cooperate with the casing conforming mold parts in initially engaging the tire heel portions or beading in initially stretching and conforming the tire casing to place the fabric under uniform tension throughout before final vulcanizing and curing.

The primary object of the invention is to provide a generally improved apparatus for vulcanizing tire casings of simple and efficient construction as will hereinafter more fully appear.

A still further and important object is the provision of an improved arrangement of tire conforming mold and core parts and particularly an improved annular core or mandrel having laterally expansible and contractible heel engaging parts to initially place the casing fabric or carcass under proper initial tension before the final vulcanizing operation. This stretching of the tire or casing takes place when the outside mold sections initially engage the heel or bead portions of the casing, and when such mold sections are brought together and placed in final position, the heel engaging mold and core parts cause the heels of the casing to be pressed inwardly toward each other and therefore stretch the side walls around the core. In view of the general form and relative arrangement of the tire and fabric structure, it will be apparent that inasmuch as the entire tire structure diminishes in diameter from its outer to its inner circumference, the lateral portions of the fabric must be condensed to produce smooth sides in the entire tire structure. Due to necessary condensation in the side portions, the threads therein are compacted, without being placed under tension, as they are at the periphery of the sructure,— and do not uniformly carry their proper individual proportion of stress and strain when the tire casing is subjected to inner tube pressure in service. Furthermore the threads in the unstretched or condensed sides of the casing structure, by yielding in response to the inner tube pressure, create a stretching action upon the rubber in the mesh of the fabric. Therefore opportunity is afforded for the inner tube pressure creating a distortion of the rubber and rupture of the casing.

The purpose of my present invention is the carrying out of a method by which the faults mentioned are overcome. With this in view, my method contemplates certain steps in the manufacture of a tire casing by virtue of which such casing will be produced with its component parts adjusted and set in the relation to each other that they will occupy when an inner tube of a tire has been inflated therein.

With the above mentioned and other ends in view, the invention consists in the novel construction, arrangement and combination of parts hereinafter described, illustrated in one of its embodiments in the accompanying drawings and particularly pointed out in the appended claims.

Referring to the drawings, forming a part of this specification, Figure 1 is a fragmentary perspective view of a section of casing and casing molds and core parts in proper relative position preparatory to the initial stretching of the tire fabric and casing and the final closing of the mold parts for final vulcanizing and curing.

Fig. 2, a fragmentary perspective view of the improved core, detached, the improved contractible and expansible tire heel engaging member or plate being in its normal or expanded position preparatory to initially engaging the tire heel in conjunction with the adjacent section of the tire casing mold part in initially stretching the tire fabric preparatory to vulcanizing.

Fig. 3, an enlarged fragmentary perspective view of a portion of one of the expansible and conctractible tire heel engaging members or plates and illustrating in particular the form and arrangement of the radially slotted laminations thereof.

Similar numerals of reference designate like parts throughout all the figures of the drawings.

The casing forming core or mandrel 1, may be formed of any suitable and convenient material and is of the usual ring shape or annular form and is provided about its outer periphery with a rounded central section 1ª, conforming to the contour of the inside of the central or tread portion of the tire casing to be formed. The sides of the annular core are provided with oppositely disposed cutaway portions forming flat surfaces 1ᵇ, extending substantially parallel with each other, said cutaway portions being of segmental shape and being adapted to receive corresponding segmental shaped side or filler plates 1ᶜ. The side plates 1ᶜ form what may be termed "cheek plates" and conjointly with the surface of the section 1ª forms a continuation of the surface or contour which forms the inside of the tread and side portions of the casing of the final shape or contour when finally formed and vulcanized as hereinafter referred to.

The segmental filler or cheek plates 1ᶜ may be secured at suitable intervals by means of attaching elements such as screws 1ᵈ, or the like, and the lower edges of the cheek plates are preferably offset from the inner curved portions of the core by means of inset recesses 1ᵉ, said inset recesses 1ᵉ being adapted to slidably receive and contain a pair of laterally expansible and contractible tire heel receiving and engaging plates 1ᶠ. The plates or members 1ᶠ are preferably formed of laminated spring metal and are preferably of ogee shape in cross section, the upper portions of the plates 1ᶠ being preferably provided with radially extending slots 1ᵍ, extending within the grooves or recesses 1ᵉ beneath the lower edges of the cheek or filler plates, said tire heel receiving and engaging plates 1ᶠ being so secured and arranged as to normally extend outwardly from the heel or inner flange portion 1ʰ, of the core and to provide inner intervening spaces 1ⁱ, when not engaged by the heel portions of the tire casing and the adjacent flanged tire heel engaging portions 2ª, of the companion or surrounding casing forming mold parts 2. When the unvulcanized casing 3 is initially placed upon the core 1, the heel or beaded portions 3ª, are adapted to be initially engaged on the outer sides of the normally expanded spring plates 1ᶠ, and it will be seen upon reference to Fig. 1 of the drawings that the intervening spaces 1ⁱ at the sides correspond substantially in width to the intervening spaces 3ᵇ, between the sides of the tire casing and the inner surfaces of the casing forming mold parts 2, so that when the latter are moved toward each other the tread and heel portions of the casing will be initially engaged between the core and mold parts.

The flanged tire heel receiving and engaging plates 1ᶠ are preferably provided at their outer sides with a covering or lamination of sheet steel 1ʲ, having slots 1ᵏ, corresponding substantially in length and spaced arrangement to the slots 1ᵍ in the plates 1ᶠ, and since these laminations or cover plates 1ʲ come into direct contact with the inner heel portions of the casing, the tire engaging or exterior portions thereof are preferably thickened midway of the slots 1ᵏ as at 1ˡ, the edges of the members formed by the slots 1ᵏ flaring into relatively thin edges 1ᵐ. The arrangement of the laterally tapered members of the outer laminations 1ʲ between the slots 1ᵏ provides a slight additional area to the casing heel engaging surfaces and reduces the chances of the heel or beaded portions becoming buckled as the casing engaging mold parts 2 are moved toward each other in cooperative relation to the laminated segmental plates 1ᶠ.

By reason of the construction and arrangement of the parts it will be apparent that upon the application of pressure to the casing engaging mold parts 2 the heel or beaded portions 3ª of the casing will be initially engaged and moved and such portions will be moved in advance of the compression which conforms the side and tread portions of the casing, this being accomplished by conforming the spring sides 1ᶠ, so that they normally stand apart some distance from the position they are caused to assume by the pressure of the casing mold parts when the latter are moved into contact with each other for final vulcanizing and curing. Thus the inner spaces 1ⁱ correspond with the closing movements of the flanged portions of the plates 1ᶠ at the sides of the heel or flange portion 1ʰ and as a consequence the fabric in the sides of the casing is stretched and placed under a uniform tension transversely of the casing to approximately the limit of the elasticity of the threads of the fabric, and the final vulcanizing of the structure takes place while such fabric is under uniform transverse tension and consequently such fabric is set in its stretched condition.

Having thus described some of the embodiments of my invention, without having attempted to set forth all the forms in which it may be made, or all the modes of its use, what I claim and desire to secure by Letters Patent is,—

1. A core for tire vulcanizing apparatus, comprising an annular core member, segmental cheek plates thereon, and normally expanded tire heel receiving plates flexibly and slidably connected to said cheek plates.

2. In a vulcanizing apparatus, an annular expansible tire core provided with segmental shaped cheek plates, and segmental tire heel engaging plates normally spaced from the sides of said core and extending from said cheek plates.

3. A core for tire vulcanizing apparatus, comprising an annular core member, segmental cheek plates at the sides of said core member, and annular normally expanded tire heel receiving plates at the sides of said core member in cooperative relation to the latter and said cheek plates.

4. In a vulcanizing apparatus, an annular expansible tire core provided at its sides with segmental shaped cheek plates, and segmental tire heel engaging plates extending from said cheek plates and spaced from said tire core and provided with radially extending slot openings communicating with said tire core and cheek plates.

5. A core for tire casing, comprising a ring shaped member having an outside contour conforming to the inside of the casing to be formed, said ring comprising a segmental central body having segmental recesses in its sides, removable segmental side plates filling said recesses, and tire heel engaging flexibly and slidably connected plates extending from said segmental side plates.

6. In a vulcanizing apparatus for tire casings, an expansible annular core provided with segmental cutaway side portions, corresponding segmental cheek plates filling said segmental cutaway side portions, and laterally expansible tire heel receiving radially slotted laminated plates extending from said cheek plates on the inner sides of said core.

7. A core for tire casings, comprising a ring shaped member having an outside contour conforming to the inside of the casing to be formed, said ring comprising a segmental central body having relatively flat side surfaces, removable segmental side plates fitted on said side surfaces, and tire heel engaging flexibly connected plates between said side plates and the stem or heel portion of said core body.

8. In a tire casing vulcanizing apparatus, a circular shaped tire core provided with segmental sides and normally expanded tire casing heel receiving radially split plates, and tire casing forming mold parts initially engaging said normally expanded radially split plates and the heel portions of the tire in transversely stretching the same from said heel portions prior to final forming and vulcanizing.

9. In a tire casing vulcanizing apparatus, a circular shaped tire core provided with oppositely disposed segmental side plates and normally expanded tire casing heel receiving segmental plates about its inner periphery, and tire casing forming mold parts having tire heel engaging flanges in cooperative relation to said normally expansible plates adapted to initially engage the heel portions of the tire in stretching the same.

10. In a vulcanizing apparatus for tire casings, an expansible annular tire core comprising a main body portion provided with segmental cutaway portions on its sides, segmental cheek plates corresponding in dimensions to said segmental cutaway portions and spaced from said main body portion about their inner peripheries, and laterally expansible and contractible tire heel receiving plates extending from said cheek plates on the inner portions of said main body portion.

11. A core for vulcanizing tire casings, comprising an annular form having an outside surface conforming in contour with the inside of the casing to be formed and provided with flat parallel extending side surfaces, segmental plates fitted on said side surfaces and conforming to the outer contour of the core, and laminated flexibly connected segmental tire heel engaging plates extending from said segmental side plates to complete the inner periphery of the core when compressed by the tire casing forming mold parts.

12. A core for tire casings, comprising a ring shaped member having a rounded outer periphery and provided with cutaway segmental side portions forming relatively flat side surfaces, segmental plates conforming to the contour of the cutaway portion and conjointly with said outer periphery adapted to conform to the inside of the casing to be formed and vulcanized, and normally expanded resilient tire heel engaging side plates extending from and flexibly connected with said segmental side plates and conforming in their contour to the completed core when contracted by the tire casing forming mold part.

13. A core for tire casings, comprising a ring shaped member having a rounded outer periphery and provided with cutaway segmental side portions forming flat side surfaces, segmental plates conforming to the contour of the cutaway portion and conjointly with said outer periphery conformed to the inside of the casing to be formed and vulcanized, and normally expanded resilient tire heel engaging side plates provided with radial slots extending from said segmental side plates, said plates having a slidable connection beneath said segmental plates and conforming in their contour to the completed core when contracted by the tire casing forming mold part.

14. A core for vulcanizing tire casings, comprising an annular form having an outside surface conforming in contour with the inside of the casing to be formed and provided with segmental cut-outs forming flat parallel extending sides, corresponding segmental plates filling said segmental cut-outs and secured to said sides and conforming to and continuing the outer contour of the core, and laminated flexibly connected tire heel engaging plates extending from said segmental side plates to complete the inner periphery of the core when compressed by the tire casing forming mold parts, said laminations being provided with radial slots forming overlapping radial members, the outer members engaging the inner heel portions of the tire being tapered to their edges resting on the inner radial members.

In testimony whereof I have affixed my signature.

JOHN TRAUM.